(12) United States Patent
Wochner et al.

(10) Patent No.: US 11,812,221 B2
(45) Date of Patent: Nov. 7, 2023

(54) SYSTEM AND METHOD FOR SIMULTANEOUSLY ATTENUATING HIGH-FREQUENCY SOUNDS AND AMPLIFYING LOW-FREQUENCY SOUNDS PRODUCED BY UNDERWATER ACOUSTIC PRESSURE SOURCE

(71) Applicant: AdBm Corp., Austin, TX (US)

(72) Inventors: Mark Wochner, Austin, TX (US); Andrew McNeese, Austin, TX (US)

(73) Assignee: AdBm Corp., Austin, TX (US)

( * ) Notice: Subject to any disclaimer, the term of this patent is extended or adjusted under 35 U.S.C. 154(b) by 361 days.

(21) Appl. No.: 17/153,344

(22) Filed: Jan. 20, 2021

(65) Prior Publication Data
US 2021/0227319 A1 Jul. 22, 2021

Related U.S. Application Data

(60) Provisional application No. 62/963,732, filed on Jan. 21, 2020.

(51) Int. Cl.
*H04R 1/44* (2006.01)
*H04R 1/22* (2006.01)
(Continued)

(52) U.S. Cl.
CPC ............. *H04R 1/44* (2013.01); *H04R 1/025* (2013.01); *H04R 1/22* (2013.01); *H04R 3/04* (2013.01)

(58) Field of Classification Search
CPC . H04R 1/44; H04R 1/025; H04R 1/22; H04R 3/04; G01V 1/137; G01V 1/3808; G10K 11/172
See application file for complete search history.

(56) References Cited

U.S. PATENT DOCUMENTS

| 2,528,049 A | 10/1950 | Desire |
| 2,610,695 A | 9/1952 | Ebbesen |

(Continued)

FOREIGN PATENT DOCUMENTS

| CN | 102094922 B | 11/2012 |
| EP | 2546829 A2 | 1/2013 |

(Continued)

OTHER PUBLICATIONS

J. Ingard, "On the Theory and Design of Acoustic Resonators", The Journal of the Acoustical Society of America, Nov. 1953, p. 1037-1061, vol. 25, No. 6.

(Continued)

*Primary Examiner* — Daniel Pihulic
(74) *Attorney, Agent, or Firm* — Intrinsic Law Corp.

(57) ABSTRACT

A noise-abatement system includes a frame defining a predetermined frame volume, an acoustic pressure source attached to the frame, and a plurality of resonators attached to the frame surrounding the acoustic pressure source. The resonators can be formed in modular resonator groups. The resonators have an individual resonance frequency that can be tuned to the transition frequency between relatively high sound frequencies, produced by the acoustic pressure source, to be attenuated and relatively low frequencies, produced by the acoustic pressure source, to be amplified. The resonators attenuate the relatively high sound frequencies using their individual resonance frequency. The noise-abatement system has a collective resonance frequency that can amplify the relatively low sound frequencies.

20 Claims, 13 Drawing Sheets

(51) Int. Cl.
*H04R 1/02* (2006.01)
*H04R 3/04* (2006.01)

(56) References Cited

U.S. PATENT DOCUMENTS

| | | | |
|---|---|---|---|
| 3,022,632 | A | 2/1962 | Parks |
| 3,487,645 | A | 1/1970 | Frankel |
| 3,886,491 | A | 5/1975 | Jonkey et al. |
| 3,975,918 | A | 8/1976 | Jansz |
| 4,241,806 | A | 12/1980 | Metzger |
| 4,300,855 | A | 11/1981 | Watson |
| 4,505,617 | A | 3/1985 | Miller et al. |
| 4,548,292 | A | 10/1985 | Noxon |
| 5,082,084 | A | 1/1992 | Ye-Ming |
| 5,394,786 | A | 3/1995 | Gettle et al. |
| 5,457,291 | A | 10/1995 | Richardson |
| 5,469,406 | A | 11/1995 | Scarpitta et al. |
| 5,587,564 | A | 12/1996 | Stief et al. |
| 5,658,656 | A | 8/1997 | Whitney et al. |
| 5,959,938 | A | 9/1999 | Behrens |
| 6,125,965 | A | 10/2000 | Wang |
| 6,550,574 | B2 | 4/2003 | Liu |
| 6,567,341 | B2 | 5/2003 | Dreyer et al. |
| 6,571,906 | B2 | 6/2003 | Jones et al. |
| 6,698,390 | B1 | 3/2004 | Kostun et al. |
| 6,743,367 | B2 | 6/2004 | Dreyer |
| 6,918,740 | B2 | 7/2005 | Liu |
| 6,977,109 | B1 | 12/2005 | Wood |
| 7,108,457 | B1 | 9/2006 | Brown et al. |
| 7,126,875 | B2 | 10/2006 | Baskerville et al. |
| 7,686,539 | B2 | 3/2010 | Aristaghes et al. |
| 7,861,804 | B2 | 1/2011 | Haglund |
| 7,896,126 | B1 | 3/2011 | Haberman et al. |
| 7,905,323 | B2 | 3/2011 | Larsen |
| 8,276,889 | B2 | 10/2012 | Norris et al. |
| 8,387,746 | B2 | 3/2013 | Parkin |
| 8,500,369 | B2 | 8/2013 | Mohr |
| 8,662,249 | B2 | 3/2014 | Nair et al. |
| 8,689,935 | B2 | 4/2014 | Wilson et al. |
| 8,794,375 | B2 | 8/2014 | Jung et al. |
| 8,887,864 | B2 | 11/2014 | Sugimoto et al. |
| 9,410,403 | B2 | 8/2016 | Wochner et al. |
| 9,812,112 | B2 * | 11/2017 | Wochner ............. G10K 11/172 |
| 2003/0006090 | A1 | 1/2003 | Reed |
| 2005/0083783 | A1 | 4/2005 | Baskerville |
| 2005/0167193 | A1 | 8/2005 | Van Reeth |
| 2007/0187174 | A1 | 8/2007 | Mayor |
| 2009/0145688 | A1 | 6/2009 | Marcoux |
| 2010/0243369 | A1 | 9/2010 | Fusiek et al. |
| 2011/0031062 | A1 | 2/2011 | Elmer |
| 2011/0186380 | A1 | 8/2011 | Beauvilain et al. |
| 2012/0097476 | A1 | 4/2012 | Jung et al. |
| 2012/0107054 | A1 | 5/2012 | Baumfalk |
| 2013/0056270 | A1 | 3/2013 | Ward |
| 2013/0111812 | A1 | 5/2013 | Fisher |
| 2013/0299274 | A1 | 11/2013 | Ayle |
| 2014/0208647 | A1 | 7/2014 | Carpenter |
| 2015/0078833 | A1 | 3/2015 | Elmer |
| 2015/0083520 | A1 | 3/2015 | Wilson et al. |
| 2015/0191987 | A1 | 7/2015 | Wochner et al. |
| 2016/0109599 | A1 | 4/2016 | Kröling |
| 2016/0210955 | A1 | 7/2016 | Lagarrigue et al. |
| 2016/0372101 | A1 * | 12/2016 | Wochner ............. G10K 11/172 |
| 2017/0276812 | A1 | 9/2017 | Morozov et al. |
| 2021/0227319 | A1 * | 7/2021 | Wochner ................. H04R 3/04 |

FOREIGN PATENT DOCUMENTS

| | | | |
|---|---|---|---|
| EP | 2657410 | A2 | 10/2013 |
| WO | 2009108071 | A9 | 9/2009 |
| WO | 2013102459 | A2 | 7/2013 |
| WO | WO-2021150567 | A1 * | 7/2021 ............. G01V 1/137 |

OTHER PUBLICATIONS

K. M. Lee et al., "Sound propagation in water containing large tethered spherical encapsulated gas bubbles with resonance frequencies in the 50 Hz to 100 Hz range", J. Acoust. Soc. Am., Nov. 2011, p. 3325-3332, vol. 130, issue 5, pt. 2, Acoustical Society of America.

K. M. Lee et al., "Mititgation of low-frequency underwater sound using large encapsulated bubbles and freely-rising bubble clouds", Proceedings of Meetings on Acoustics, May 2011, vol. 12, Acoustical Society of America through the American Institute of Physics.

K. Lee et al., "Attenuation of low-frequency underwater sound using bubble resonance phenomena and acoustic impedance mismatching", Proceedings of Meetings on Acoustics, Nov. 2010, vol. 11, Acoustical Society of America through the American Institute of Physics.

US ISA, "International Search Report", PCT/US14/70602, dated May 22, 2015, WIPO.

Wochner et al., "Attenuation of low frequency underwater noise using arrays of air-filled resonators", Inter-noise Nov. 2014, Melbourne, Australia.

US ISA, "International Search Report", PCT/US16/38096, dated Sep. 16, 2016, WIPO.

US ISA, "International Search Report", PCT/US21/14125, dated Mar. 31, 2021, WIPO.

* cited by examiner

SYSTEM AND METHOD FOR SIMULTANEOUSLY ATTENUATING HIGH-FREQUENCY SOUNDS AND AMPLIFYING LOW-FREQUENCY SOUNDS PRODUCED BY UNDERWATER ACOUSTIC PRESSURE SOURCE

CROSS-REFERENCE TO RELATED APPLICATIONS

This application claims priority to U.S. Provisional Patent Application No. 62/963,732, titled "System and Method for Mitigating Underwater Air Gun Noise," filed on Jan. 21, 2020, which is hereby incorporated by reference.

TECHNICAL FIELD

This disclosure relates to underwater noise mitigation systems, such as those designed to operate along with underwater acoustic pressure sources.

BACKGROUND

There is a need for systems that mitigate waterborne noise in offshore applications such as pile driving, drilling and other industrial activity. One source of underwater noise addressed by this disclosure is that of airguns.

The basic operation of a generalized airgun is such that compressed air fills up a hollow chamber in a shuttle, which seals a main chamber. This main chamber is then pressurized and ready to be fired. To fire the device, a solenoid valve is energized, which pressurizes the triggering chamber and causes the shuttle to be rapidly released and uncover the ports connected to the main chamber. The high-pressure air (2,000-3,000 psi) is quickly released from the main chamber and generates the primary acoustic pulse. For the usual shallow operations of airguns, the total ambient pressure is far below that of the pressurized chamber (less than 30 psi for depths less than 10 meters). Thus, when the shuttle is released the air within the main chamber grows to an equivalent volume many times that of the initial volume. This growth in bubble size can be 2-3 orders of magnitude in size from the initial pressurized conditions.

SUMMARY

The present disclosure provides in some aspects a system and method for abatement and mitigation of underwater noise, such as that generated by airguns, which can assist in altering the output acoustic signal as desired. The ability to specifically design resonator cavities and strategically group them around an airgun provides the means to attenuate unwanted high-frequency noise, while also amplifying the low frequency content of the acoustic signal that is desirable and commonly used in offshore seismic efforts. Indeed, the low-frequency amplification of up to 20 dB expected from a system of this type may make up for the additional drag created by it. The present system may be field deployed in some embodiments as a towable configuration along with one or more airguns.

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a noise-abatement system comprising a frame defining a predetermined frame volume, the frame configured to be submersed in a liquid; an acoustic pressure source attached to the frame; a plurality of resonator groups attached to the frame, each resonator group including a plurality of resonators defined in a common base, each resonator having an open end, a closed end, and a sidewall that extends from the open end to the closed end to define a resonator volume, each resonator configured to retain a gas in the resonator volume when the resonator is submersed in the liquid while the open end is aligned with a direction of gravitational pull such that the each resonator has an individual resonance frequency; a plurality of streamlined bodies attached to the frame, each streamlined body having a recess to receive at least one of the resonator groups. The individual resonance frequency of each resonator is at a transition frequency between relatively high sound frequencies and relatively low sound frequencies, the relatively high sound frequencies and the relatively low sound frequencies produced by the acoustic pressure source. The relatively high sound frequencies have a higher frequency than the relatively low sound frequencies. The individual resonance frequency attenuates an acoustic pressure of the relatively high sound frequencies. The system has a collective resonance frequency that is related to a void fraction of the apparatus, the void fraction determined as a ratio of a collective volume of the gas retained in the resonators to the predetermined frame volume. The collective resonance frequency amplifies an acoustic pressure of the relatively low frequencies.

In one or more embodiments, the acoustic source comprises an airgun. In one or more embodiments, a first resonator group is attached to a first level of the frame, a second resonator group is attached to a second level of the frame, and a third resonator group is attached to a third level of the frame, the second level vertically disposed between the first and third levels. In one or more embodiments, the acoustic pressure source is attached to the second level of the frame. In one or more embodiments, the acoustic pressure is disposed above a gap between the second resonator group and a fourth resonator group, the fourth resonator group attached to the second level of the frame.

In one or more embodiments, the void fraction is within a range of about 0.5% to about 10%. In one or more embodiments, the individual resonance frequency of each resonator is within a range of about 20 Hz to about 300 Hz. In one or more embodiments, the individual resonance frequency of each resonator is about 100 Hz. In one or more embodiments, the collective resonance frequency is within a range of about 20 Hz to about 70 Hz. In one or more embodiments, at least one of the streamlined bodies includes a horizontal fin, and the streamlined bodies are oriented in the same direction.

In one or more embodiments, at least one of the streamlined bodies includes a vertical stabilizer fin. In one or more embodiments, in each resonator group: the common base has first and second planar surfaces that are parallel with one another, and a plurality of holes are defined in the common base between at least some of the resonators.

Another aspect of the invention is directed to a method for simultaneously attenuating and amplifying acoustic pressure, comprising: placing the apparatus in the liquid; producing the relatively high sound frequencies and the relatively low sound frequencies with the acoustic pressure source; attenuating the acoustic pressure of the relatively high sound frequencies using the individual resonance frequency of each resonator; and amplifying the acoustic pressure of the relatively low sound frequencies using the collective resonance frequency of the system.

In one or more embodiments, the method further comprises towing the apparatus in water using a tow line connected to the frame.

Another aspect of the invention is directed to a method of manufacturing a noise-abatement system, comprising: forming a plurality of resonator groups, each resonator group comprising: a base having a first planar surface and a second planar surface that are parallel with one another; and a plurality of hollow bodies, each hollow body having a first end, a second end, and a sidewall therebetween, the second end integrally connected to the second planar surface of the base, the body having an aperture defined in the first end, the aperture extending from the first end to the second end, the aperture defining a volume in the hollow body, the hollow body configured to retain a gas in the volume when the resonator group is disposed in a liquid while the aperture is aligned with a direction of gravitational pull. The method further comprises attaching an acoustic pressure source to a frame that defines a predetermined frame volume; and attaching the resonator groups to the frame to surround the acoustic pressure source to form the noise-abatement system. Each hollow body is configured to have an individual resonance frequency based on an intended depth of deployment of the resonator group in the liquid. The individual resonance frequency of each hollow body is at a transition frequency between relatively high sound frequencies and relatively low sound frequencies, the relatively high and low sound frequencies produced by the acoustic pressure source, the relatively high sound frequencies having a higher frequency than the relatively low sound frequencies. Each resonator is configured to attenuate an acoustic pressure of the relatively high sound frequencies. The noise-abatement system has a collective resonance frequency that is related to a void fraction of the noise-abatement system, the void fraction determined as a ratio of a collective volume of the gas retained in the hollow bodies to the predetermined frame volume. The collective resonance frequency amplifies an acoustic pressure of the relatively low sound frequencies.

In one or more embodiments, the method further comprises defining a plurality of holes in the base of each resonator group between at least some of the resonators, the holes configured to allow a gas bubble to pass through when the noise-abatement apparatus is disposed in the liquid to reduce a buoyancy of the noise-abatement system. In one or more embodiments, the method further comprises attaching a first resonator group to a first level of the frame; attaching the acoustic pressure source to a second level of the frame; and attaching a second resonator group to a third level of the frame, the second level vertically disposed between the first and third levels.

In one or more embodiments, the method further comprises attaching third and fourth resonator groups to the second level of the frame, the acoustic pressure source disposed between the third and fourth resonator groups. In one or more embodiments, the acoustic pressure source comprises an airgun. In one or more embodiments, the method further comprises attaching a plurality of streamlined bodies to the frame; and placing each resonator group in a recess of a respective streamlined body.

BRIEF DESCRIPTION OF THE DRAWINGS

For a fuller understanding of the nature and advantages of the present technology, reference is made to the following detailed description of preferred embodiments and in connection with the accompanying drawings, in which.

DETAILED DESCRIPTION

Figure 1A:
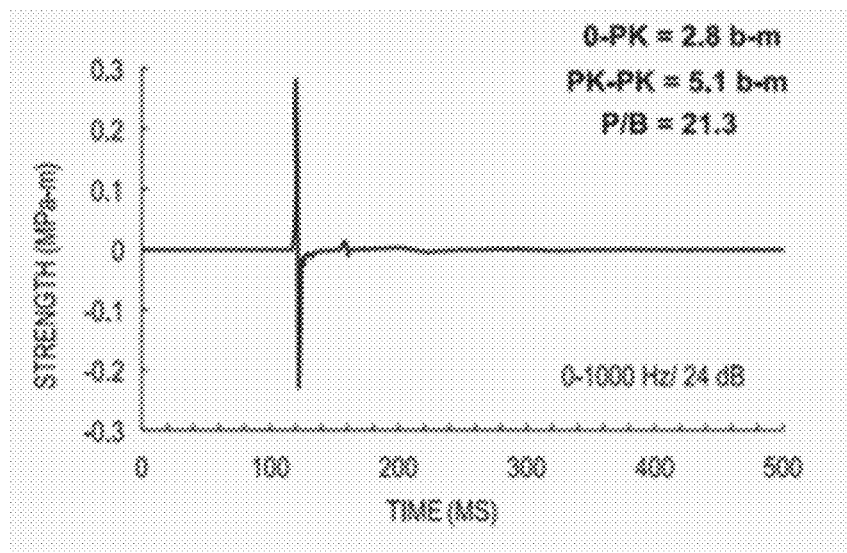
FIGS. 1A and 1B illustrate an example acoustic time series and far-field spectrum, respectively, for an airgun.

The present inventors and applicant have developed offshore systems capable of mitigating waterborne noise for a variety of applications. These modular systems are generally comprised of specially designed injection-molded resonator blocks that can be assembled and mounted in a variety of deployment frameworks. The design geometry of each block and the assembled configuration of blocks allows the end-user to target specific frequency bands that are of concern for a particular offshore project.

Each resonator block consists of a discrete number of open-bottom cavities that trap a volume of air when lowered into the water while the open-bottom cavity is aligned with or pointed in the same direction as the direction of gravitational pull. Each individual bubble inside the cavity has an acoustic resonance that absorbs acoustic energy by thermal, viscous, and radiation damping. The cavity geometry, the trapped volume of air, and the deployment depth all combine to determine the individual resonance frequency of each cavity. When collections of individual resonators are assembled into a Noise Abatement System (NAS), the overall effect on a sound wave passing by is a reduction of acoustic pressure for frequencies above the individual resonance frequency of the resonators. The number of resonators used in the system is directly related to the level of attenuation that is attained above the individual cavity resonance frequency. Instead of the total number of resonators, a commonly-used parameter is the void fraction (VF), defined as the ratio of the volume of air in the system to the total volume of the system. Beyond the individual bubble resonance, another NAS resonance can occur within the frequency band of interest for this application, given a sufficiently-small system. A collective resonance (e.g., a collective resonance frequency) of the entire system can occur below the individual-cavity resonance frequency, and results in an increase in acoustic pressure rather than a decrease of acoustic pressure near the system.

The collective resonance frequency and magnitude of this effect are dependent largely on the VF and the size of the system, and to some extent the system geometry. The system can be tuned to the user's requirements by altering these parameters, such that given accurate knowledge of the source signal frequency content, the system can be designed so that the collective resonance frequency is tuned to the client's needs. In other words, for a known acoustic pressure spectrum for a particular noise source, the NAS can be designed so that the individual cavity resonance frequency is at the transition point or transition frequency of where the desired band of higher frequencies are to be attenuated and the lower band of frequencies can be amplified or are out of the band of interest. The overall amount of reduction and amplification is directly related to the VF.

The NAS can be used to simultaneously (a) attenuate the acoustic pressure of high-frequency acoustic energy (e.g., above the transition frequency) using the individual cavity resonance frequency of each resonator or cavity and (b) amplify the acoustic pressure of low-frequency acoustic energy (e.g., below the transition frequency) using the collective resonance frequency of the system or apparatus. The high- and low-frequency acoustic energy can be produced by an acoustic pressure source, such as an airgun, a pile driver, an engine, an explosive device, an impulsive acoustic pressure source, or other acoustic pressure source.

Figure 1B:
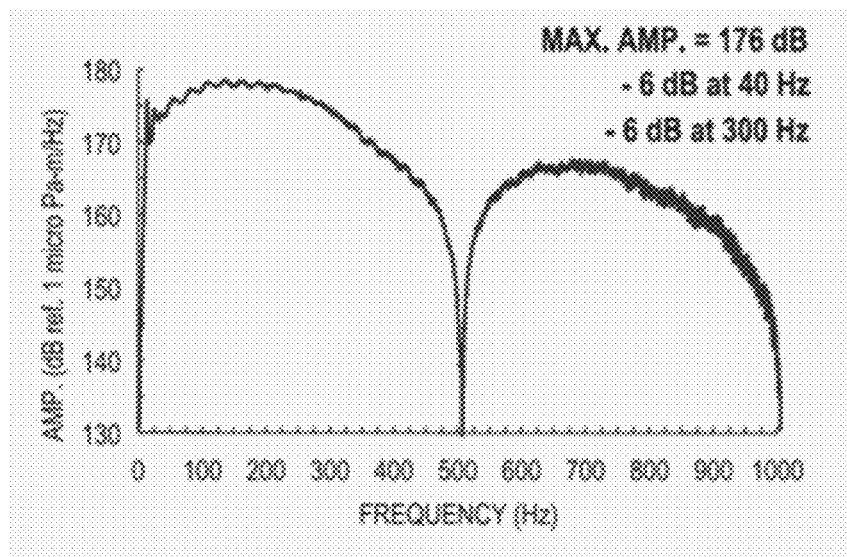

An example of an airgun is the GGun150, the GI-SOURCE, and the G-SOURCE II available from Sercel of France. The GGun150 and GI-SOURCE are examples of controlled bubble airguns referred to as Generator-Injector airguns for use as a seismic sound source. Generator-Injector airguns include two independent airgun chambers within the same casing known as the "Generator" and the "Injector." The "Generator" chamber creates the primary pulse and air bubble, and the "Injector" chamber strategically injects air inside this air bubble in a timed manner to increase the internal pressure of the air bubble and prevent/reduce its violent collapse. This methodology greatly reduces the residual bubble oscillations and secondary pressure pulses commonly found in other airguns. An example acoustic time series and far-field spectrum for a GI-Gun are illustrated in FIGS. 1A and 1B, respectively. The GI-Gun was fired at 2,000 psi at a depth of 1.5 meters.

Figure 2:
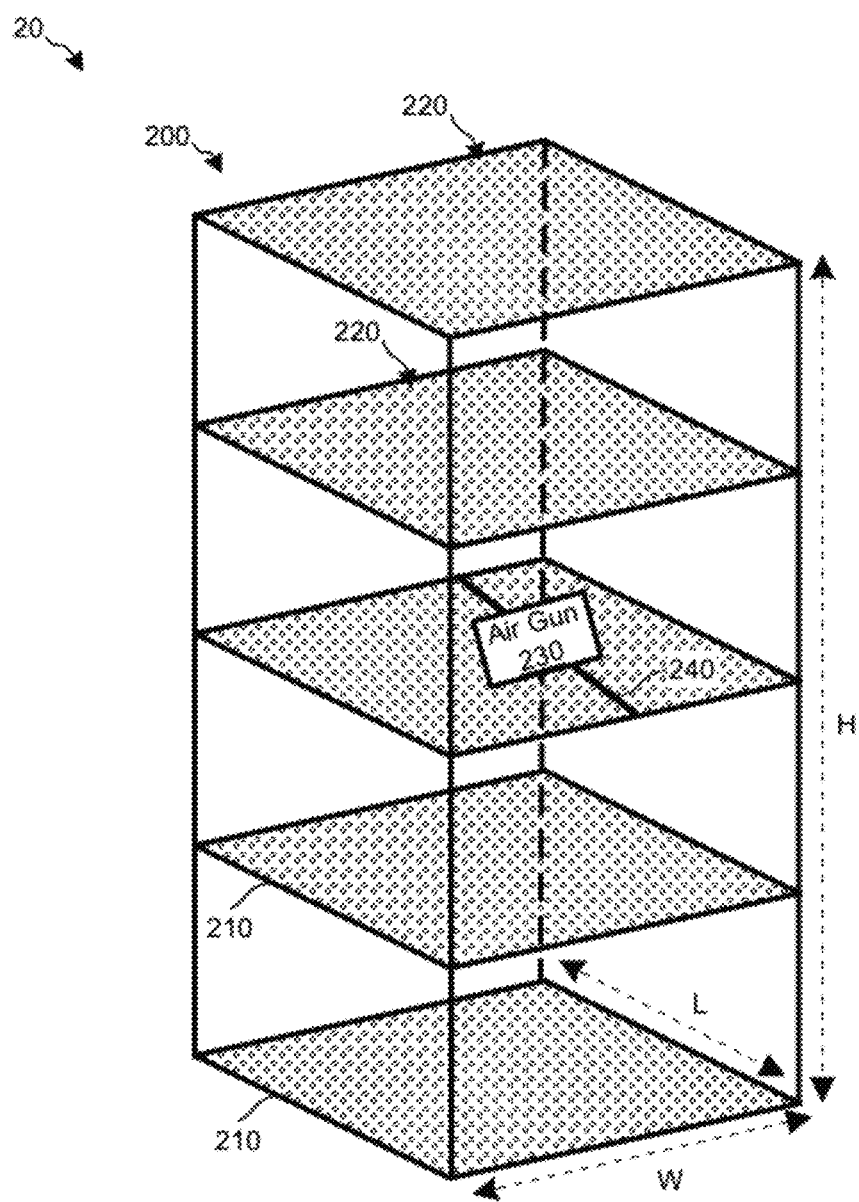
FIG. 2 is an isometric perspective view of a noise-abatement system according to an embodiment.

FIG. 2 is an isometric perspective view of an NAS 20 according to an embodiment. The NAS 20 includes a frame 200 having a plurality of planar levels 210. Each level 210 is configured to hold a plurality of resonators 220, which are represented as hatching in FIG. 2. The frame 200 is configured to support an airgun 230 on the middle level 210, such as by a support 240. On the middle level 210, the airgun 230 is surrounded by or substantially surrounded by the resonators 220. The airgun 230 can be disposed on a different level 210 or between levels 210 in other embodiments. The airgun 230 can be replaced with another impulsive acoustic pressure source, a combustive sound source, or another acoustic pressure source.

The frame 200 has a volume based on the overall frame dimensions. For example, frame 200 can be a rectangular prism having a height H, a length L, and a width W, which defines the volume of the frame 200. The frame 200 can have other geometries such as a cube, a cylinder, a sphere, or another shape. The volume of the frame can be about 6 cubic meters to about 20 cubic meters, including about 8 cubic meters, about 10 cubic meters, about 12 cubic meters, about 14 cubic meters, about 16 cubic meters, about 18 cubic meters, and any value or range between any two of the foregoing volumes.

The resonators 220 have open cavities that are oriented in the same direction so that each resonator 200 retains a volume of gas (e.g., air) when the NAS 20 is placed in a liquid such as water. The resonators 220 can be formed of plastic, stainless steel, or another material. In some embodiments, the resonators 220 are formed of injection-molded plastic. Some or all of the resonators 220 on a given level 210 can share a common base. Each resonator 220 is preferably identical and/or has an open cavity that defines the same or about the same internal volume to retain gas. In other embodiments, the resonators 220 can have open cavities that define different volumes. For example, the resonators 220 can include a plurality of resonator groups that define a respective plurality of volumes to retain gas. In a specific example, the plurality of resonator groups include a first resonator group in which each resonator has an open cavity that defines a first volume to retain gas, a second resonator group in which each resonator has an open cavity that defines a second volume to retain gas, a third resonator group in which each resonator has an open cavity that defines a third volume to retain gas, and/or a fourth resonator group in which each resonator has an open cavity that defines a fourth volume to retain gas. The first, second, third, and fourth volumes can be the same or different than each other.

The airgun 230 can have a stainless steel cylinder that is about 70 cm long with a dimeter of about 15 cm. In an example, the airgun 230 may have a plurality, e.g., four, air outlet openings with dimensions of about 6 cm×about 3 cm each, whereby the air escapes omnidirectionally. The total volume of the two air chambers in the stainless steel cylinder can total about 150 cubic inches (about 2.4 liters). However, the total volume of the two air chambers can be adjusted by means of inserting/removing plastic volume reducers within the chambers to "tune" the output as desired. The air chambers are pressurized to a nominal working pressure between about 2,000 to about 3,000 psi and are able to achieve a firing interval between events of 10 seconds or less. In some embodiments, a plurality of airguns 230 (e.g., an airgun array) can be mounted on the NAS 20 with multiple chambers to further increase the acoustic output as desired.

The collective volume of gas retained by the resonators 210 when the NAS 20 is submerged in water at a target depth determines the VF of the noise-reduction NAS 20. The VF is defined as the ratio of the volume of gas (e.g., air) in the system to the total volume of the system, as discussed above. The VF is directly related to the collective resonance frequency the NAS 20. The VF can be selected based on the size of the NAS 20, the transition acoustic spectrum of the airgun 230, and/or the desired transition point or transition frequency.

Figure 3:
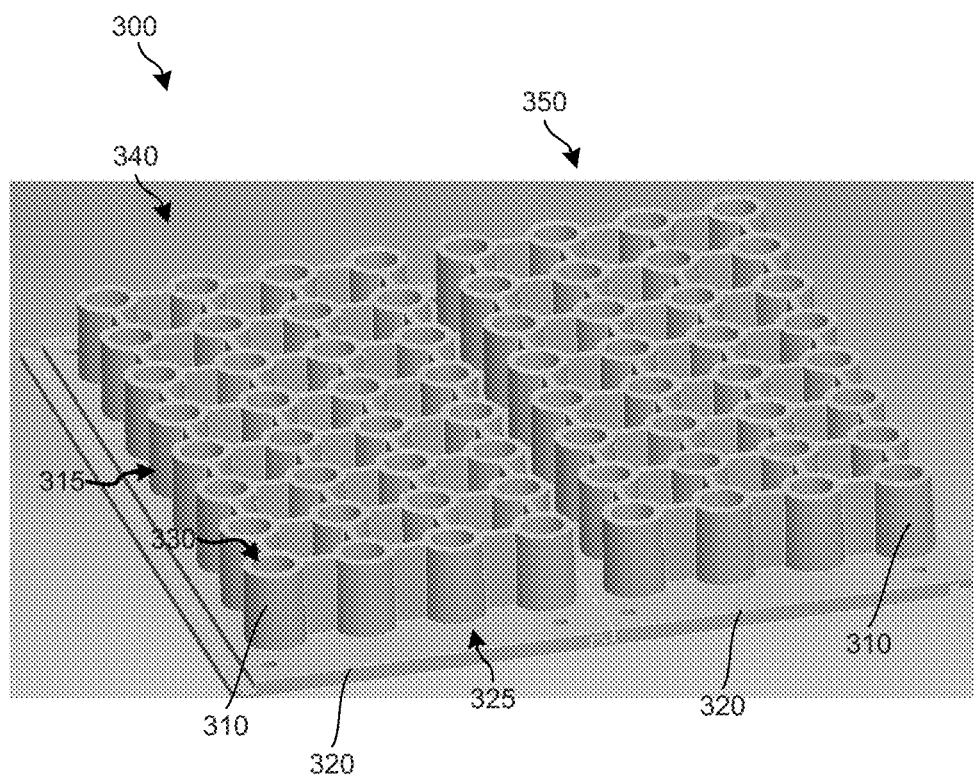
FIG. 3 is a perspective view of an array of resonators according to an embodiment.

FIG. 3 is a perspective view of an array 300 of resonators 310 according to an embodiment. The resonators 310 are disposed on a planar base 320. The resonators 310 are generally cylindrical in shape and have a sidewall 312 that extends from the base 320. An aperture 330 is defined at a distal end of the resonator 310 from the base 320. The proximal end from the base 320 is closed to form a hollow body that extends from the base 320. The array 300 includes a plurality of rows 315 and columns 1125 or resonators 310. However, the resonators 310 can be disposed in other configurations, such as in irregularly-spaced and/or irregularly-aligned rows 315 and/or columns 325. The array 300 includes a first resonator group 340 formed on a first common base 320 and a second resonator group 350 formed on a second common base 320. The resonators 310 can be the same as or different than resonators 220.

In operation, the resonator array 300 is deployed in an ocean (or other body of water) with the apertures 330 of the resonators 310 facing towards the direction of gravitational pull (i.e., towards the ocean bottom). Such deployment causes a volume of gas (e.g., air) to be trapped between the aperture 330 and the base 320 to form a resonating body. The individual resonance frequency of each resonator 310 is a function of the volumes of gas and liquid trapped between the aperture 330 and the base 320. The amount of liquid in the aperture 330 sets the effective mass of the resonator 310 and the individual resonance frequency of the resonator 310.

The resonators 310 can be manufactured by injection molding, for example, using a thermoplastic material. Similar manufacturing processes (e.g., liquid injection molding, reaction injection molding, etc.) are considered and included in this disclosure. In an injection molding process, the resonators 310 can be integrally connected to the base 320. The resonators 310 and base 320 can be formed of the same material, such as a thermoplastic material as discussed above. By manufacturing the resonators 310 using injection molding (or similar/equivalent processes), the shape, alignment, orientation, spacing, size, etc. of the resonators 310 can be varied as desired. Alternatively, the resonators 310 can be machined and can comprise or can be formed of a metal such as stainless steel.

Figure 4:
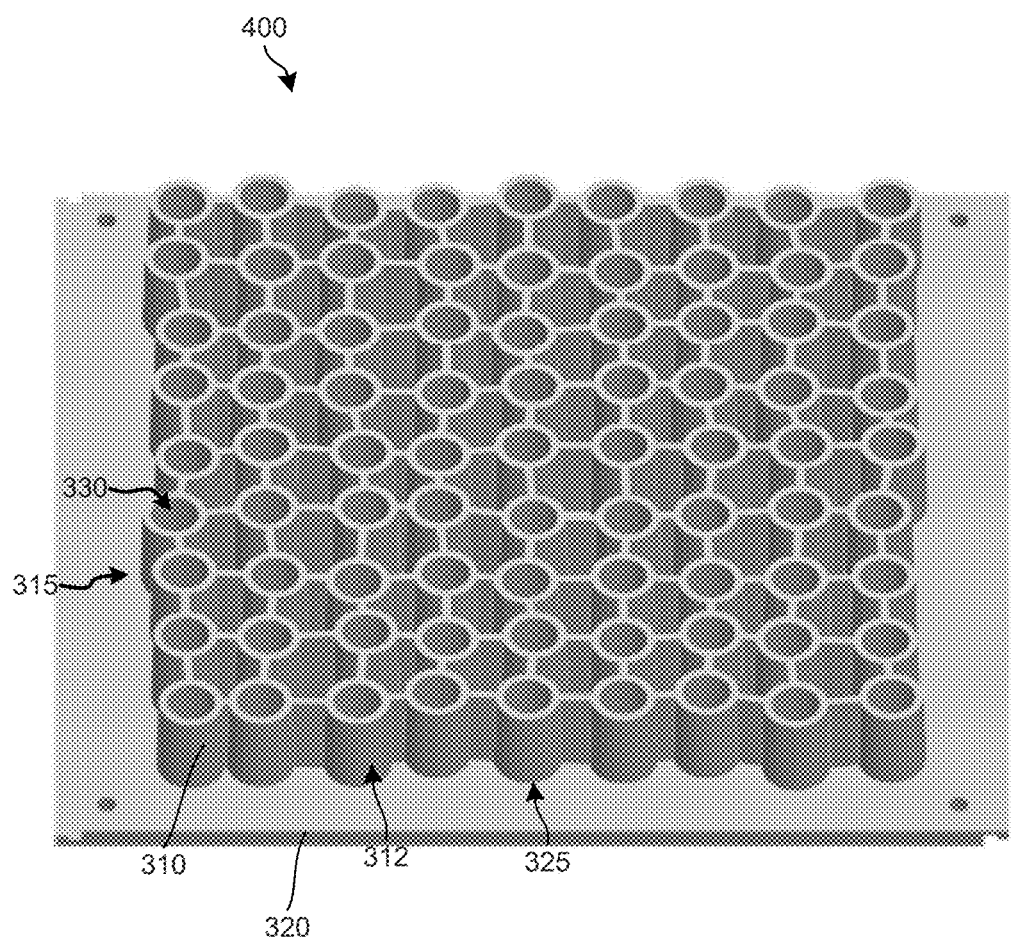
FIG. 4 is a perspective view of an array of resonators according to an alternative embodiment.

For example, the array 300 can include resonators 310 having different sizes and/or shapes to enhance the acoustic dampening of the array of resonators. For example, some resonators can have a generally circular cross section while others can have a generally rectangular cross section. In addition or in the alternative, some resonators can have a volume (e.g., a relatively large volume) while other resonators can have a second volume (e.g., a relatively small volume). In addition or in the alternative, some resonators can have a first aperture size (e.g., a narrow aperture) while other resonators can have a second aperture size (e.g., a wide aperture). In addition, or in the alternative, some resonators can have a first body having a first height and/or a first wall thickness while other resonators can have a second body having a second height and/or a second wall thickness. Such sizes and/or shapes can be regularly or irregularly distributed throughout the array. In addition or in the alternative, the spacing between adjacent resonators can be regular or irregular. In addition or in the alternative, the alignment of resonators 310 in a given row 315 and/or column 325 can be regular or irregular, such array 400 illustrated in FIG. 4.

Figure 5:
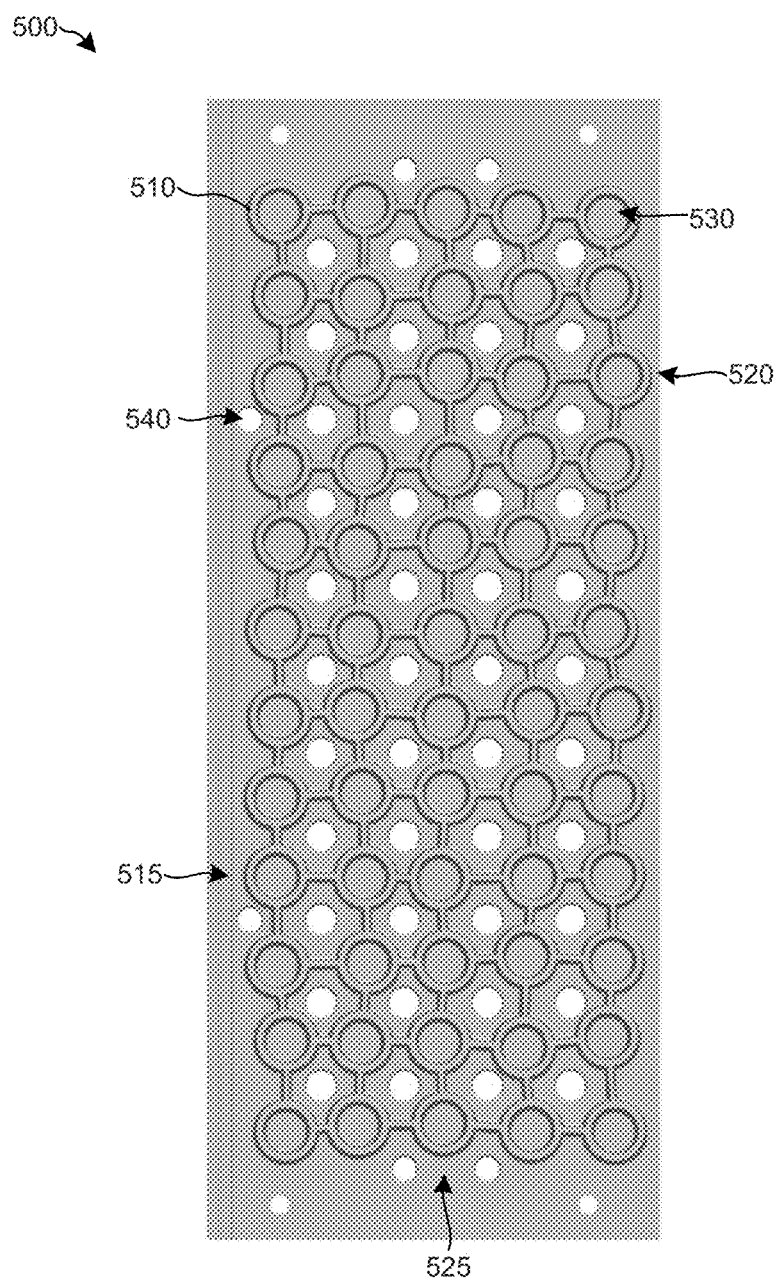
FIG. 5 is a top view of an array of resonators according to an embodiment.

FIG. 5 is a top view of an array 500 of resonators 510 according to an embodiment. As illustrated, the resonators 510 are irregularly spaced or offset and thus not every resonator 510 is fully aligned in a row 515 or column 525. Instead, the spacing of at least some of the resonators 510 is offset positively or negatively so that some resonators 510 are spaced closer together to each other while other resonators 510 are spaced further apart from each other. A plurality of holes 540 is defined in base 520 of array 500. The holes 540 are disposed between adjacent resonators 510 and are arranged in columns and rows parallel to columns 525 and rows 515 (without the negative/positive offset discussed above). The holes 540 can facilitate the submersion of the array 500 into a liquid such as a water body (e.g., a lake or the ocean) by allowing air bubbles to pass through the holes 540. As the liquid displaces the air bubbles, the array 500 becomes less buoyant and submerges more readily into the ocean. The resonators 510 can be the same as or different than resonators 220.

In some embodiments, the holes 540 are only disposed between some adjacent resonators 510. The holes 540 can be offset between adjacent resonators 510 where a hole 540 is closer to a first resonator 510 than a second resonator 510. In addition, or in the alternative, the holes 540 can be arranged in a regular or irregular pattern. In addition, or in the alternative, the holes 540 can have different sizes and/or shapes. As discussed above, the array 500 is deployed in a liquid (e.g., an ocean or other body of water) with the apertures 530 facing toward the direction of gravitational pull (e.g., toward the bottom of the ocean).

Figure 6:
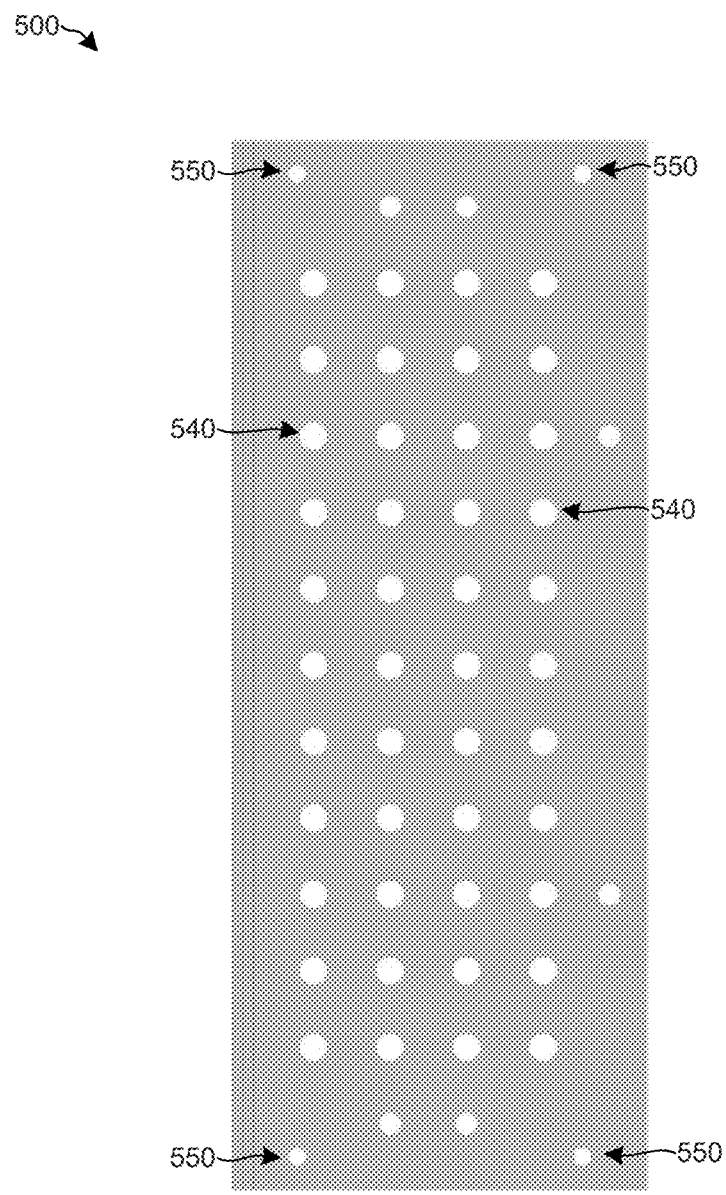
FIG. 6 is a bottom view of the resonator array illustrated in FIG. 5.

FIG. 6 is a bottom view of the array 500 from the opposing side of the base 520 as that illustrated in FIG. 5. Since the resonators 510 are on the opposing side of the base 520, only holes 540, 550 are viewable in this figure. In operation, the exposed surface shown in FIG. 6 would face towards the ocean surface while the opposing side (with the resonators 510 extending therefrom) would face towards the ocean floor. Holes 550 are defined in the corners of the base 520 to receive respective lines (e.g., ropes, chains, etc.) that are disposed between each array to form a panel of resonators 510. The lines can be tethered to a frame such as frame 200. Additional details regarding the resonators, such as resonators 310, 510, and resonator assemblies are disclosed in U.S. Pat. No. 9,812,112, titled "Injection Molded Noise Abatement Assembly and Deployment System," which is hereby incorporated by reference.

Figure 7:
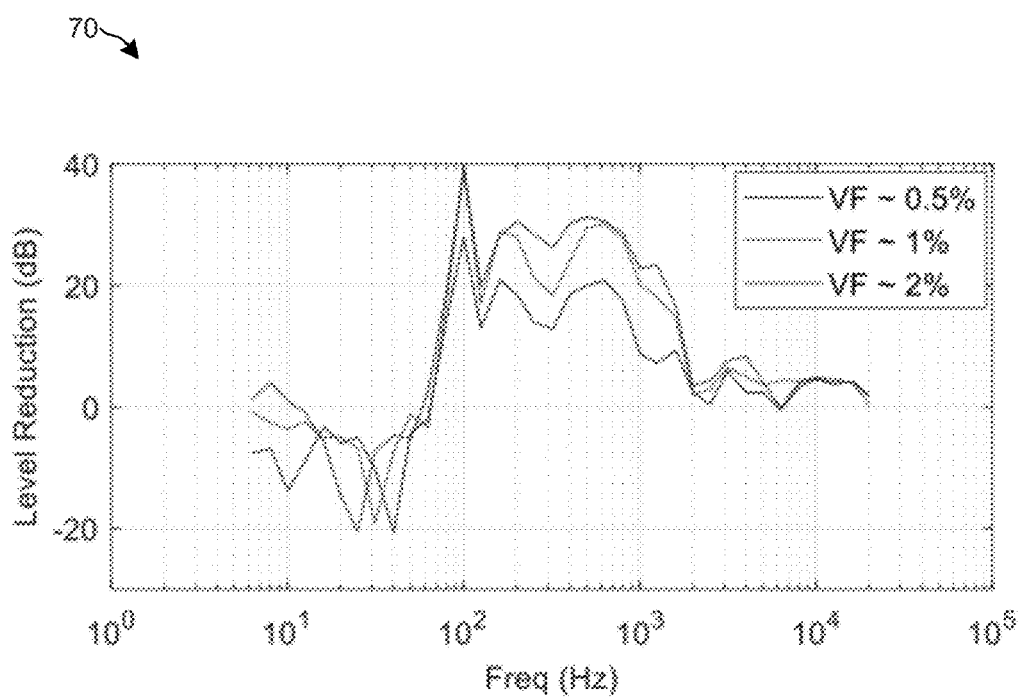
FIG. 7 is a graph of the attenuation of a combustive sound source signal as a function of the void fraction of the noise-abatement system illustrated in FIG. 2.

FIG. 7 is a graph 70 of the attenuation (in dB) of a combustive sound source signal (e.g., an airgun) as a function of the void fraction of NAS 20. As illustrated, the attenuation was measured of NAS 20 using VFs of about 0.5%, about 1%, and about 2%. To create a VF of about 0.5%, 30 blocks or arrays of identical resonators were mounted on NAS 20 for testing. To create a VF of about 1%, 60 blocks or arrays of identical resonators were mounted on NAS 20 for testing. To create a VF of about 2%, 120 blocks or arrays of identical resonators were mounted on NAS 20 for testing. The same size resonators were used to create each VF. Testing was conducted in a 2,650 cubic meter test tank (17 m diameter×12 m depth).

The resonators were configured to have an individual resonance frequency. The resonators attenuated the combustive sound source at and above the resonance frequency. The attenuation increased with the number of resonators deployed (e.g., 30 arrays for about 0.5% VF, 60 arrays for about 1% VF, and 120 arrays for about 2% VF). The NAS 20 amplified the combustive sound source below the resonance frequency starting at approximately 70 Hz which corresponds to the collective resonance frequency of NAS 20. However, the collective resonance frequency varied as a function of the VF. While an increased number of resonators generally increases the overall attenuation levels, a smaller VF (e.g., about 0.5%) can reduce the size of system, which can also be deployed in a towable configuration along with the airguns (e.g., as in NAS 20).

Figure 8:
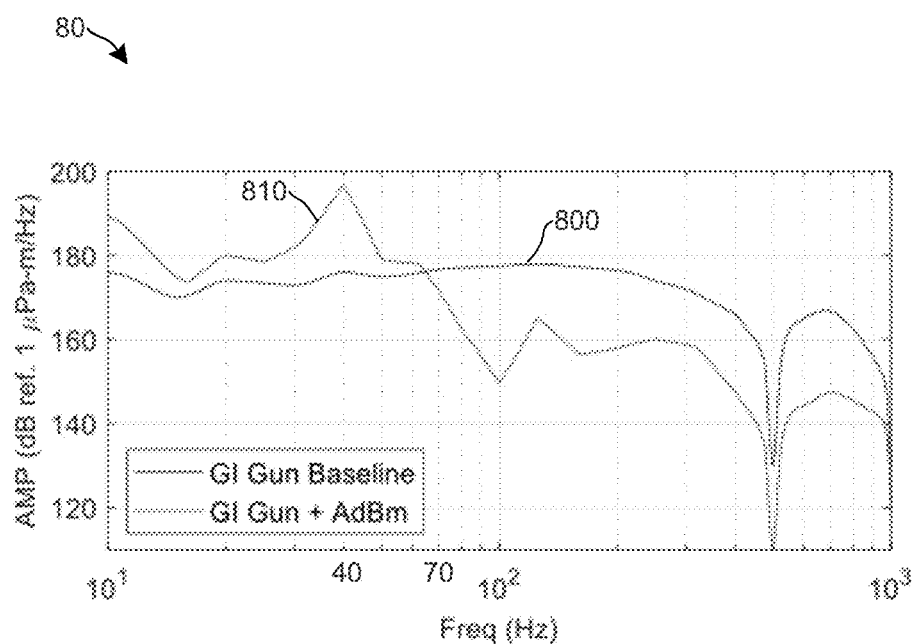
FIG. 8 is a graph that illustrates the baseline spectral levels produced by an airgun under ordinary operating conditions and the predicted spectral levels produced by mounting the airgun in the noise-abatement system illustrated in FIG. 2.

FIG. 8 is a graph 80 that illustrates the baseline spectral levels 800 produced by a GI-Gun (e.g., airgun 230) under ordinary operating conditions and predicted spectral levels 810 produced by mounting the GI-Gun in the NAS 20 where the NAS 20 has a VF of about 0.5% and is comprised of resonators with a resonance frequency of 100 Hz. The baseline spectral levels 800 are the same as those illustrated in FIG. 1B. The predicted spectral levels 810 were estimated by combining the level reduction results of about 0.5% from FIG. 7 with the baseline spectral levels 800.

Graph 80 illustrates that the predicted spectral levels 810 are reduced, compared to baseline spectral levels 800, above 70 Hz, with the greatest reduction occurring at 100 Hz (e.g., at the individual resonance frequency of the resonators), and the predicted spectral levels 810 are amplified below about 70 Hz, which is the collective resonance frequency of the NAS 20. In the predicted spectral levels 810, the maximum amplification occurs at about 40 Hz and is on the order of 20 dB, an order of magnitude increase in acoustic pressure.

It is noted that the ability to tune the system response is possible through differing various design features such as the individual resonance frequency of the resonators, the total void fraction, and the system geometry. The ability to alter each of these design features allows for a system to be fabricated that strategically alters the output acoustic signal as desired. One should note that the predicted spectral levels 810 is based on one embodiment of NAS 20. Other modified spectral shapes and/or levels are possible through tuning the NAS as desired.

Figure 9:
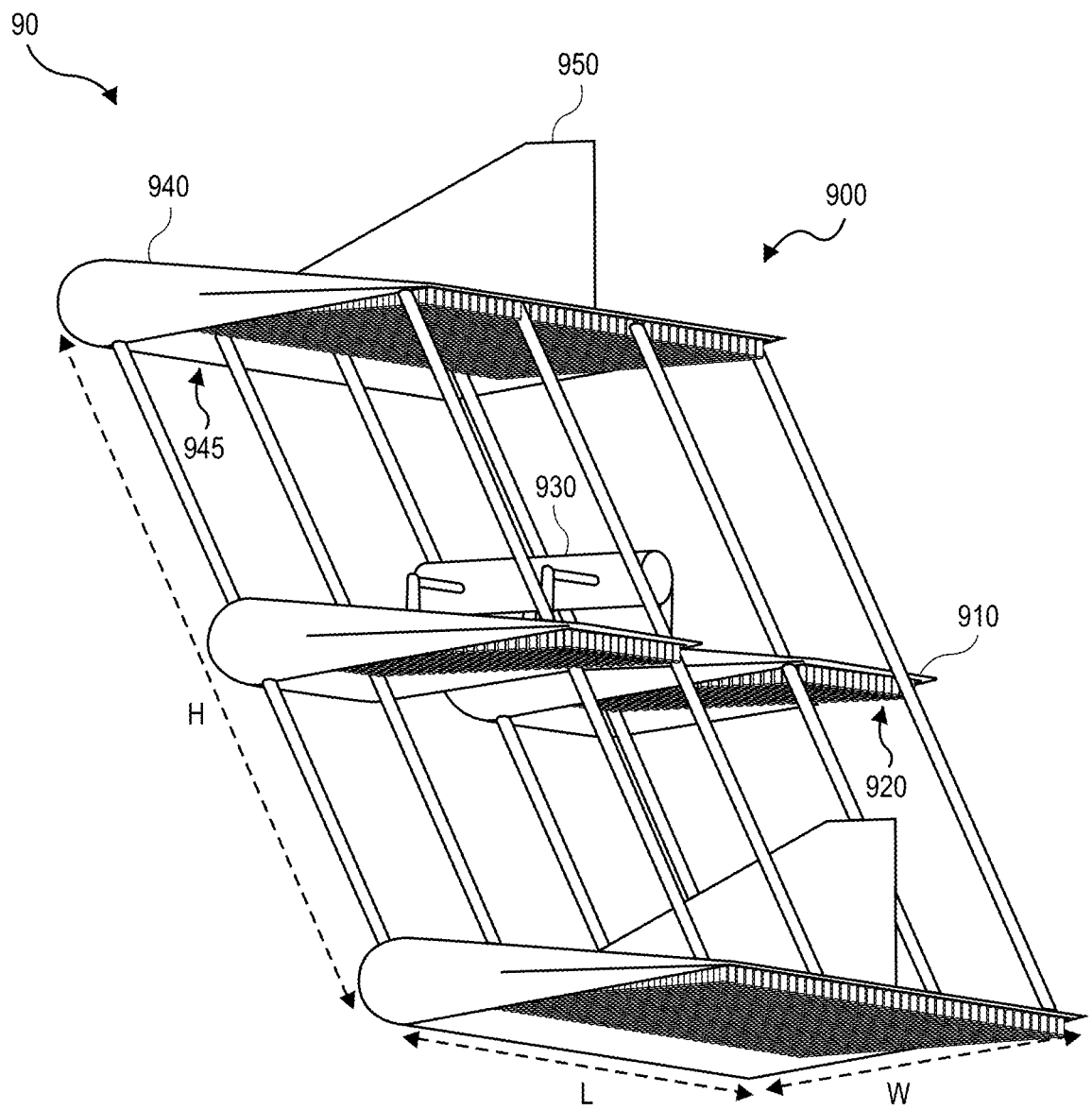
FIGS. 9-11 illustrate various perspective views of a noise-abatement system according to another embodiment.
Figure 10:
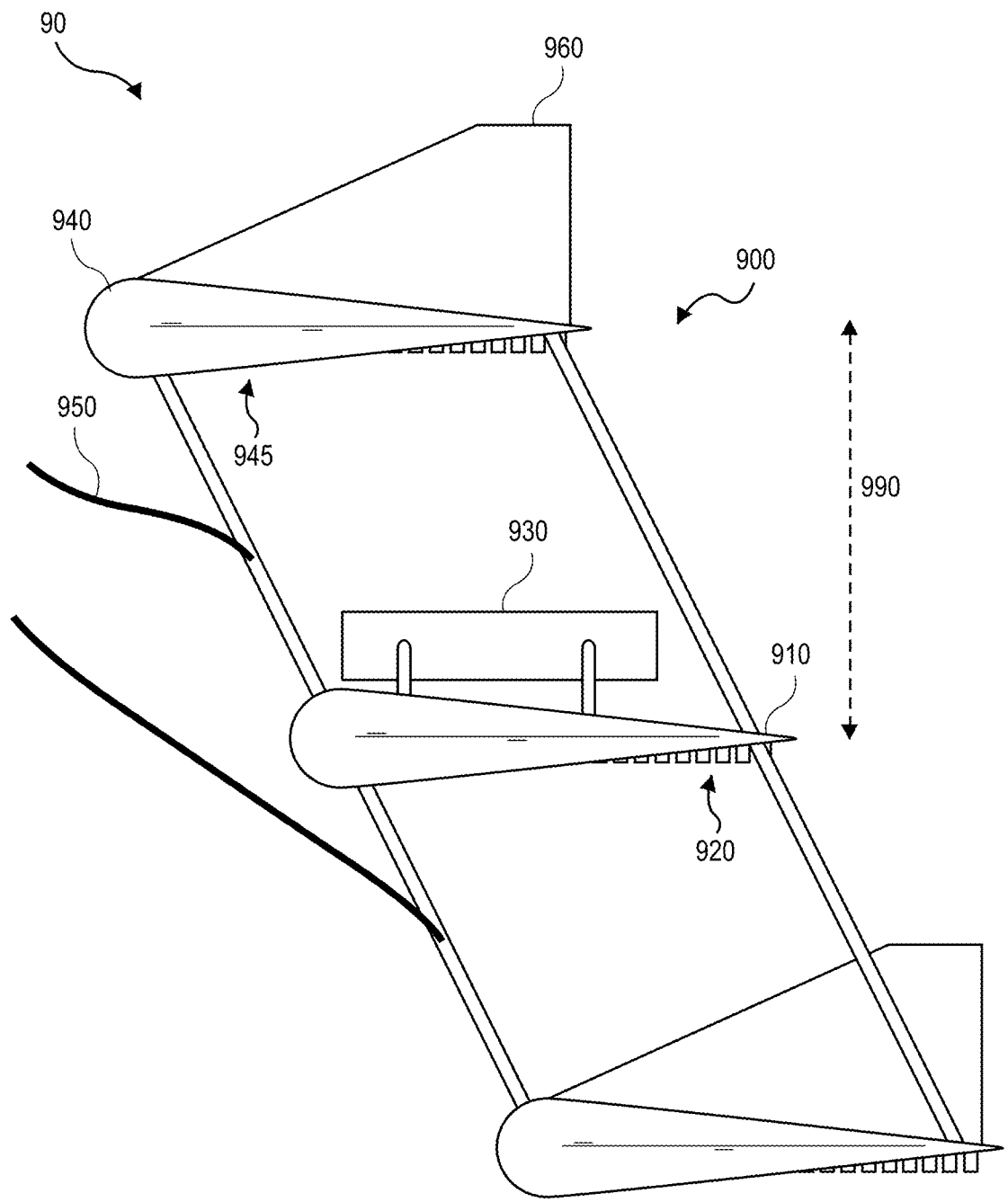
Figure 11:
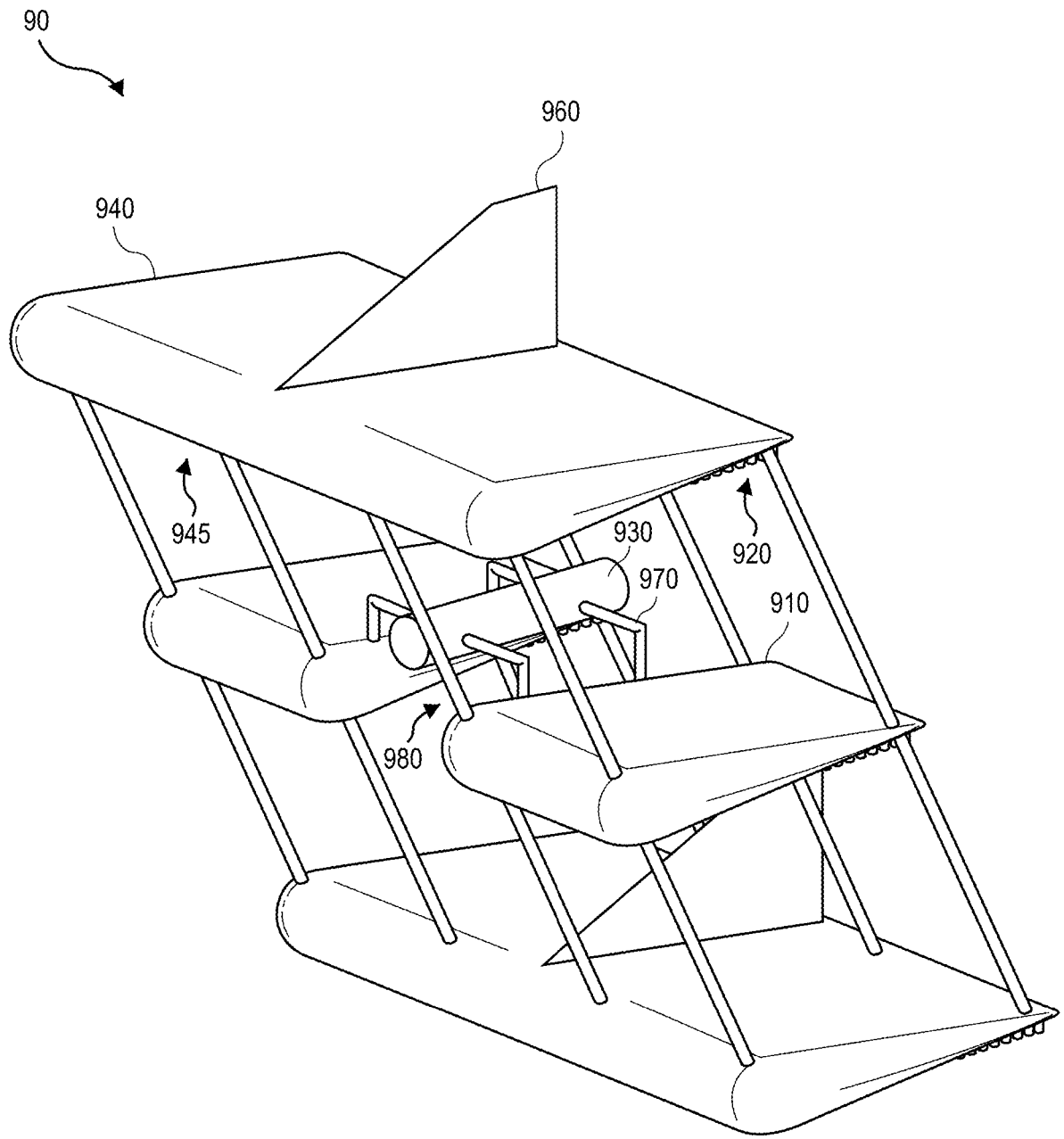

FIGS. 9-11 illustrate various perspective views of a NAS 90 according to an embodiment.

NAS 90 includes a frame 900 having a plurality of planar levels 910. A plurality of resonators 920 is attached to and/or supported by each level 910. The resonators 920 can be the same as or different than any of the resonators described herein such as resonators 220, 310, and/or 510. The resonators 920 are preferably identical or substantially identical (e.g., having dimensions within a manufacturing tolerance such as about 5% of each other) to each other. The frame 900 is configured to support an airgun 930 on the middle level 910. The airgun 930 is surrounded by or substantially surrounded by the resonators 920. The airgun 930 can be disposed on a different level 910 or between levels 910 in other embodiments. Airgun 930 can be the same as any airgun described herein including airgun 230.

The resonators 920 can comprise a plurality of resonator arrays or blocks, such as arrays 300, 400, and/or 500, where each resonator array has a common base. The resonator arrays can be modularly added and/or removed from the frame 900 to create a customized VF of NAS 90. For example, resonators 920 having a predetermined size can be attached to the frame 900 to set the VF of NAS 90 and/or the individual resonance frequency of the resonators 920. The VF of NAS 90 can be in the range of about 0.25% to about 10%, including about 0.5%, about 1%, about 1.5%, about 2%, about 2.5%, about 3%, about 3.5%, about 4%, about 4.5%, about 5%, about 5.5%, about 6%, about 6.5%, about 7%, about 7.5%, about 8%, about 8.5%, about 9%, about 9.5%, and any value or range between any two of the foregoing VFs. The individual resonance frequency of the resonators 920 can be in the range of about 20 Hz to about 300 Hz, including about 25 Hz, about 50 Hz, about 100 Hz, about 150 Hz, about 200 Hz, about 250 Hz, and any value or range between any two of the foregoing individual resonance frequencies. In another example, the number of resonators 920 attached to the frame 900 can be adjusted (e.g., increased or decreased) to set the VF of NAS 90 (e.g., within the above-described range of about 0.25% to about 10%).

The VF of NAS 90, dimensions of NAS 90, and/or geometry of NAS 90 can set the collective resonance frequency of NAS 90, which can be in the range of about 5 Hz to about 100 Hz, including about 10 Hz, about 20 Hz, about 30 Hz, about 40 Hz, about 50 Hz, about 60 Hz, about 70 Hz, about 80 Hz, about 90 Hz, and any value or range between any two of the foregoing collective resonance frequencies.

The frame 900 has a volume based on the overall frame dimensions and frame shape. For example, frame 900 is illustrated as a parallelepiped having a height H, a length L, and a width W, which defines the volume of the frame 200. The frame 900 can have other geometries such as a rectangular prism, a cube, a cylinder, a sphere, or another shape. The volume of the frame 900 can be about 6 cubic meters to about 20 cubic meters, including about 8 cubic meters, about 10 cubic meters, about 12 cubic meters, about 14 cubic meters, about 16 cubic meters, about 18 cubic meters, and any value or range between any two of the foregoing volumes. In another embodiment, the volume of the frame 900 can be about 20 cubic meters to about 100 cubic meters, including about 40 cubic meters, about 60 cubic meters, about 80 cubic meters, and any value or range between any two of the foregoing volumes. Smaller or larger volumes of frame 900 can also be used.

A streamlined structure such as a horizontal fin 940 is mounted on each level 910 of the frame 900. The bottom of each horizontal fin 940 includes a recess 945 in which the resonators are mounted or housed. The horizontal fins 940 can reduce the drag when the system 90 is towed in a water or other liquid, for example by using one or more tow lines 950 (FIG. 10). The frame 900 can also include one or more vertical fins 960 that can function as vertical stabilizers to provide directional stability (when the system 90 is towed in a water or other liquid. In some embodiments, the horizontal fins 940 and/or the vertical fins 960 can improve hydrodynamic stability.

The airgun 930 can be mounted or attached to the frame 900 using airgun supports 970. The airgun supports 970 can be L-shaped, J-shaped, or another shape. The airgun 930 is disposed above a gap 980 between neighboring horizontal fins 930 on the middle level 910 of the frame 900. The airgun supports 970 can extend from the airgun 930 to an adjacent horizontal fin 930 on the middle level 910 of the frame 900.

The frame 900 can be configured such that the vertical distance or spacing 990 between the resonators 920 in each frame level 910 is less than the wavelength at the individual resonance frequency of the resonators 920. When the individual resonance frequency is 100 Hz, the underwater wavelength of a corresponding 100 Hz tone is about 15 meters. In contrast, the vertical spacing 990 can be about 1 meter when the frame 900 has a height of about 2 meters. In this example, the underwater wavelength of a tone at the individual resonance frequency of 100 Hz is about 15 times the vertical spacing 990. In other examples, the underwater wavelength of a tone at the individual resonance frequency can be about 2 times to about 20 times the vertical spacing 990, including about 5 times, about 10 times, about 15 times, and any value or range between any two of the foregoing multipliers.

When the individual resonance frequency is 100 Hz and the vertical spacing 990 is about 1 meter, it is noted that this vertical spacing 990 will being to allow sound to pass through NAS 90 without encountering the resonators 920 starting at frequencies greater than about 1.5 kHz. The underwater wavelength of a 1.5 kHz tone is about 1 meter. More generally, sound can begin to pass through NAS 90 when the underwater wavelength is less than or equal to the vertical spacing 990. The larger the multiplier or ratio between the underwater wavelength of a tone at the individual resonance frequency and the vertical spacing 990, the wider the range of sound frequencies that will encounter the resonators 920 when passing through NAS 90. Though some attenuation occurs in sound frequencies having an underwater wavelength that is less than or equal to the vertical spacing 990, the attenuation performance of NAS 90 begins to degrade for these sound frequencies. However, the resonators 920 become significantly less effective starting between 1 kHz and 2 kHz, as illustrated in FIGS. 7 and 8, so the degradation of NAS 90 attenuation performance starting at 1.5 kHz, in the example above, is not significant.

When designing NAS 90, it is recognized that adding additional components, such as the frame 900 and the horizontal and vertical fins 940, 960, will result in some non-desirable costs, such as an increase in system drag, weight, and ease of deployment/recovery. A rough estimate of the increase in system drag range from 10-20 times that of towing an airgun without the surrounding NAS (e.g., NAS 90). This is calculated by assuming first that the airgun alone has a drag coefficient of 1.1 (modeled as a short cylinder), and the NAS with its generally streamlined shape has a drag coefficient of 0.3. A 2 cubic meter NAS increases the total cross-sectional area by about a factor of 60, so the airgun with the NAS has a total drag of 0.3 multiplied by 60, or 18. Compared to the drag coefficient of 1.1 for the airgun alone, this is drag coefficient of 18 is about 16 times higher. The increase in the drag coefficient is a tradeoff with the low-frequency signal amplification and the high-frequency signal attenuation caused by the NAS. It is expected that with further development and optimization the drag could be reduced considerably.

Although the embodiment illustrated in FIGS. 9-11 is for that of a single airgun 930, the same basic concept could remain for pairs of airguns or slightly modified configurations, as the streamlined fin housings 940 can be fabricated for various groups of resonator blocks to surround a sound source used in towed configurations.

In other aspects, adding more resonators blocks would further improve the desired acoustic signal, additional hardware leads to an increase in drag and system weight, which must be limited for offshore deployments. Yet other aspects allow the open-ended resonator cavities to maintain their necessary volume of air through long deployments and in the direct vicinity of the airgun blast. Since the operation of an airgun requires an air (or gas) source to the device, this could in some optional embodiments be utilized to help add additional air (or gas) to the resonator cavities if and when necessary. Still other aspects address the flow noise generated by towing the NAS. Some embodiments are designed and configured, as shown, to remain below the acoustic output levels of an airgun blast such that a sufficient Signal-to-Noise ratio will be maintained throughout operation.

Figure 12:
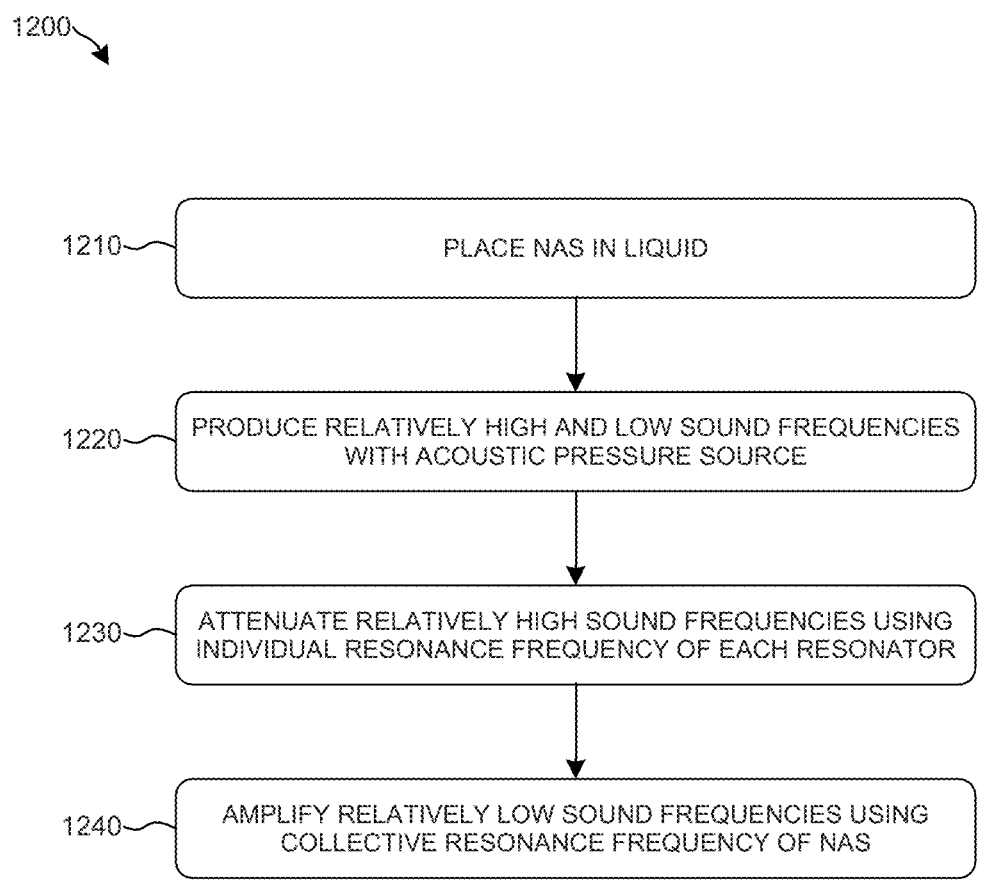
FIG. 12 is a flow chart of a method 1200 for simultaneously attenuating and amplifying acoustic pressure according to an embodiment.

FIG. 12 is a flow chart of a method 1200 for simultaneously attenuating and amplifying acoustic pressure according to an embodiment. In step 1210, a NAS is placed in a liquid. The liquid can be water such as a water tank or a body of water (e.g., ocean, lake, pond, etc.), though other liquids can be used. The NAS can be the same as any of the noise-abatement systems described herein including NAS 20, 90.

In step 1220, sound waves are produced using an acoustic pressure source, which produces a spectrum of sound frequencies including relatively high sound frequencies and the relatively low sound frequencies. The acoustic pressure source can be an impulsive acoustic pressure source, such as an airgun (e.g., as described herein).

In step 1230, the acoustic pressure of the relatively high sound frequencies, produced by the acoustic pressure source, is attenuated using the individual resonance frequency of each resonator in the NAS. The resonators in the NAS can be identical or substantially identical and thus can have the same or substantially the same individual resonance frequencies. The individual resonance frequency can be at the transition frequency between the relatively high sound frequencies, produced by the acoustic pressure source, to be attenuated and the relatively low sound frequencies, produced by the acoustic pressure source, to be amplified.

In step 1240, the acoustic pressure of the relatively low sound frequencies, produced by the acoustic pressure source, is amplified by the collective resonance frequency of the NAS.

Figure 13:
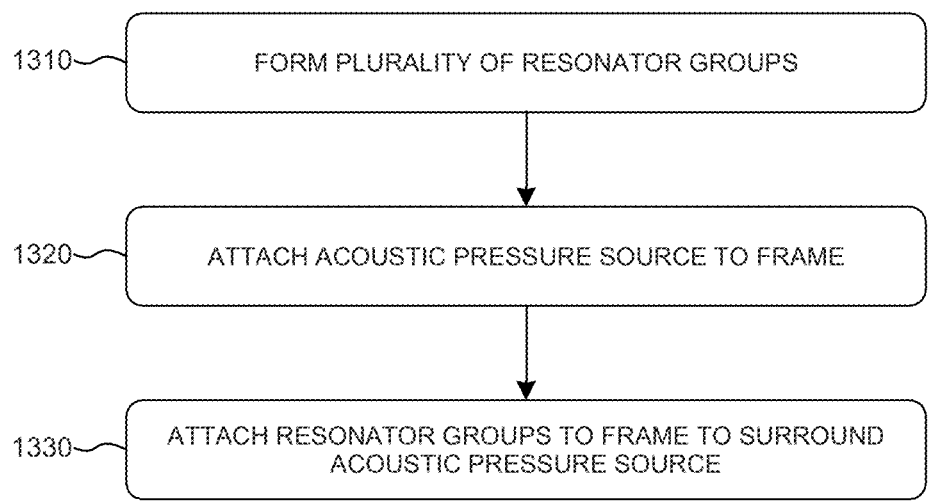
FIG. 13 is a flow chart of a method 1300 of manufacturing a noise-abatement system.

FIG. 13 is a flow chart of a method 1300 of manufacturing a noise-abatement system.

In step 1310, a plurality of resonator groups is formed. Each resonator group includes (a) a base having a first planar surface and a second planar surface that are parallel with one another and (b) a plurality of hollow bodies. Each hollow body has, in a cross section orthogonal to the second planar surface, a first end, a second end, and a sidewall therebetween. The second end is integrally connected to the second planar surface of the base. The hollow body includes an aperture defined in the first end, the aperture extending from the first end to the second end, the aperture defining a volume in the hollow body, the hollow body configured to retain a gas in the volume when the resonator group is disposed in a liquid while the aperture is aligned with a direction of gravitational pull. The resonator groups can be the same as described above, such as resonator arrays 300, 400, 500.

Each hollow body is configured to have an individual resonance frequency based on an intended depth of deployment of the resonator group in the liquid. In some embodiments, a plurality of holes can be defined in the base of each resonator group between at least some of the resonators, the holes configured to allow a gas bubble to pass through when the noise-abatement apparatus is disposed in the liquid to reduce a buoyancy of the noise-abatement system In step 1320, an acoustic pressure source (e.g., an impulsive acoustic pressure source such as an airgun) is attached to a frame that defines a predetermined frame volume. The frame can have a plurality of levels, which can be planar.

In step 1330, the resonator groups are attached to the frame to surround the acoustic pressure source to form the NAS. The NAS can be the same as NAS 20, 90. In some embodiments, a first resonator group is attached to a first level of the frame, the acoustic pressure source is attached to a second level of the frame, and a second resonator group is attached to a third level of the frame. The second level is between the first and third levels. Third and fourth resonator groups can be attached to the second level of the frame such that the acoustic pressure source is disposed between the third and fourth resonator groups.

The individual resonance frequency of each hollow body can be at a transition frequency between relatively high sound frequencies and relatively low sound frequencies, the relatively high and low sound frequencies produced by the acoustic pressure source. Each resonator is configured to attenuate the acoustic pressure of the relatively high sound frequencies. In addition, the NAS has a collective resonance frequency that is related to a void fraction of the noise-abatement system, the void fraction determined as a ratio of a collective volume of the gas retained in the hollow bodies to the predetermined frame volume. The collective resonance frequency amplifies the acoustic pressure of the relatively low sound frequencies.

The invention should not be considered limited to the particular embodiments described above, but rather should be understood to cover all aspects of the invention as fairly set out in the attached claims. Various modifications, equivalent processes, as well as numerous structures to which the invention may be applicable, will be apparent to those skilled in the art to which the invention is directed upon review of this disclosure. The claims are intended to cover such modifications and equivalents.

What is claimed is:

1. A noise-abatement system comprising:
a frame defining a predetermined frame volume, the frame configured to be submersed in a liquid;
an acoustic pressure source attached to the frame;
a plurality of resonator groups attached to the frame, each resonator group including a plurality of resonators defined in a common base, each resonator having an open end, a closed end, and a sidewall that extends from the open end to the closed end to define a resonator volume, each resonator configured to retain a gas in the resonator volume when the resonator is submersed in the liquid while the open end is aligned with a direction of gravitational pull such that the each resonator has an individual resonance frequency;
a plurality of streamlined bodies attached to the frame, each streamlined body having a recess to receive at least one of the resonator groups,
wherein:
the individual resonance frequency of each resonator is at a transition frequency between relatively high sound frequencies and relatively low sound frequencies, the relatively high sound frequencies and the relatively low sound frequencies produced by the acoustic pressure source,
the relatively high sound frequencies have a higher frequency than the relatively low sound frequencies,
the individual resonance frequency attenuates an acoustic pressure of the relatively high sound frequencies,
the system has a collective resonance frequency that is related to a void fraction of the system, the void fraction determined as a ratio of a collective volume of the gas retained in the resonators to the predetermined frame volume, and
the collective resonance frequency amplifies an acoustic pressure of the relatively low frequencies.

2. The system of claim 1, wherein the acoustic source comprises an airgun.

3. The system of claim 1, wherein a first resonator group is attached to a first level of the frame, a second resonator group is attached to a second level of the frame, and a third resonator group is attached to a third level of the frame, the second level vertically disposed between the first and third levels.

4. The system of claim 3, wherein the acoustic pressure source is attached to the second level of the frame.

5. The system of claim 4, wherein the acoustic pressure is disposed above a gap between the second resonator group and a fourth resonator group, the fourth resonator group attached to the second level of the frame.

6. The system of claim 1, wherein the void fraction is within a range of about 0.5% to about 10%.

7. The system of claim 6, wherein the individual resonance frequency of each resonator is within a range of about 20 Hz to about 300 Hz.

8. The system of claim 7, wherein the individual resonance frequency of each resonator is about 100 Hz.

9. The system of claim 8, wherein the collective resonance frequency is within a range of about 20 Hz to about 70 Hz.

10. The system of claim 1, wherein:
at least one of the streamlined bodies includes a horizontal fin, and
the streamlined bodies are oriented in the same direction.

11. The system of claim 1, wherein at least one of the streamlined bodies includes a vertical stabilizer fin.

12. The system of claim 1, wherein in each resonator group:
the common base has first and second planar surfaces that are parallel with one another, and
a plurality of holes are defined in the common base between at least some of the resonators.

13. A method for simultaneously attenuating and amplifying acoustic pressure, comprising:
placing the system of claim 1 in the liquid;
producing the relatively high sound frequencies and the relatively low sound frequencies with the acoustic pressure source;
attenuating the acoustic pressure of the relatively high sound frequencies using the individual resonance frequency of each resonator; and
amplifying the acoustic pressure of the relatively low sound frequencies using the collective resonance frequency of the system.

14. The method of claim 13, further comprising towing the system in water using a tow line connected to the frame.

15. A method of manufacturing a noise-abatement system, comprising:
forming a plurality of resonator groups, each resonator group comprising:
a base having a first planar surface and a second planar surface that are parallel with one another; and
a plurality of hollow bodies, each hollow body having a first end, a second end, and a sidewall therebetween, the second end integrally connected to the second planar surface of the base, the body having an aperture defined in the first end, the aperture extending from the first end to the second end, the aperture defining a volume in the hollow body, the hollow body configured to retain a gas in the volume when the resonator group is disposed in a liquid while the aperture is aligned with a direction of gravitational pull;
attaching an acoustic pressure source to a frame that defines a predetermined frame volume; and
attaching the resonator groups to the frame to surround the acoustic pressure source to form the noise-abatement system;
wherein:
each hollow body is configured to have an individual resonance frequency based on an intended depth of deployment of the resonator group in the liquid,
the individual resonance frequency of each hollow body is at a transition frequency between relatively high sound frequencies and relatively low sound frequencies, the relatively high and low sound frequencies produced by the acoustic pressure source,
the relatively high sound frequencies having a higher frequency than the relatively low sound frequencies,
each resonator is configured to attenuate an acoustic pressure of the relatively high sound frequencies,
the noise-abatement system has a collective resonance frequency that is related to a void fraction of the noise-abatement system, the void fraction determined as a ratio of a collective volume of the gas retained in the hollow bodies to the predetermined frame volume, and the collective resonance frequency amplifies an acoustic pressure of the relatively low sound frequencies.

16. The method of claim 15, further comprising defining a plurality of holes in the base of each resonator group between at least some of the resonators, the holes configured to allow a gas bubble to pass through when the noise-abatement system is disposed in the liquid to reduce a buoyancy of the noise-abatement system.

17. The method of claim 15, further comprising:
attaching a first resonator group to a first level of the frame;
attaching the acoustic pressure source to a second level of the frame; and
attaching a second resonator group to a third level of the frame, the second level vertically disposed between the first and third levels.

18. The method of claim 17, further comprising attaching third and fourth resonator groups to the second level of the frame, the acoustic pressure source disposed between the third and fourth resonator groups.

19. The method of claim 16, wherein the acoustic pressure source comprises an airgun.

20. The method of claim 15, further comprising:
attaching a plurality of streamlined bodies to the frame; and
placing each resonator group in a recess of a respective streamlined body.

* * * * *